April 24, 1951     A. C. KRUKONIS     2,550,273
SHUTTLE TIP
Filed Dec. 30, 1948
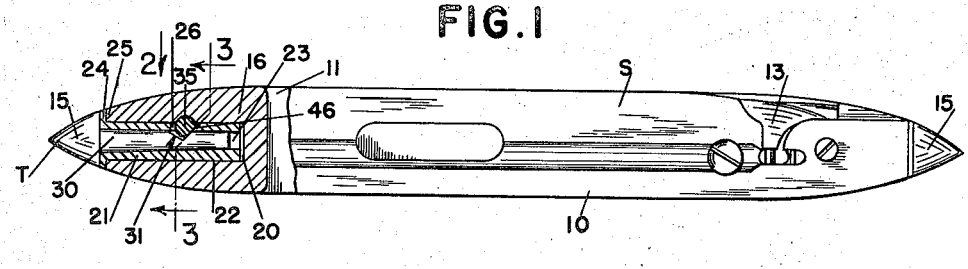
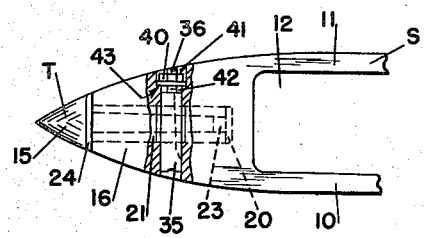
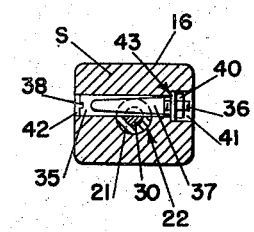
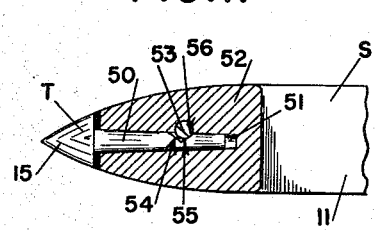
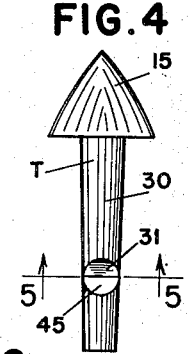
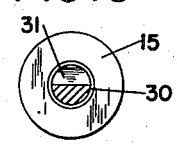
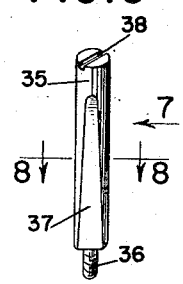
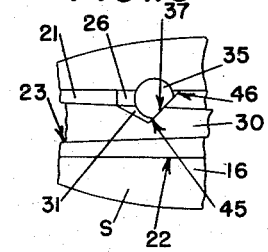
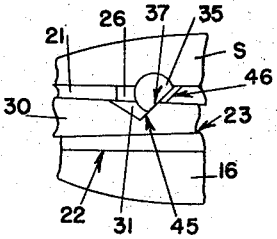
INVENTOR.
ALEXANDER C. KRUKONIS.
Chas. P. Hawley
ATTORNEY.

Patented Apr. 24, 1951

2,550,273

UNITED STATES PATENT OFFICE 2,550,273

SHUTTLE TIP

Alexander C. Krukonis, Auburn, Mass., assignor to Crompton & Knowles Loom Works, Worcester, Mass., a corporation of Massachusetts Application December 30, 1948, Serial No. 68,192

7 Claims. (Cl. 139—196)

1

This invention relates to improvements in loom shuttles and it is the general object of the invention to provide improved means for holding the shuttle tip firmly in position on the shuttle.

Loom shuttles are customarily made with a conical tip at each end thereof to receive the shuttle propelling force derived from a picker. These tips are usually metallic whereas the body of the shuttle is made of a non-metallic material, such as wood, and it has been found difficult in the past to hold the tip tightly in position on the shuttle so that it will withstand the jarring incident to picking and checking of the shuttle.

It is an important object of the present invention to provide two interacting wedge or tapered members one of which is the shank member of the shuttle tip and the other of which is a transverse member or stud coacting with the shank member in such manner that transverse motion of the stud relatively to the shuttle in a given direction will draw the shank into the shuttle body. The transverse motion of the stud may be effected by means of a nut or the like screw threaded on one end thereof and effective when turned to draw the stud in a direction to tighten the shank.

It is a further object of the invention to provide the shank member with a notch to receive a tapered or wedge shaped part of the stud, the notched part of the shank member cooperating with the stud not only to draw the shank into the shuttle body as already mentioned but also prevent rotation of the shank relatively to the shuttle box.

It is a still further object of the invention to provide a shuttle having a preferably metallic tubular member therein provided with a flange and an internal tapering bore together with a shuttle tip member having a conical head and a shank fitting the bore and engaged by a transverse stud which passes through registering notches in the tubular member and the shank. When moved transversely of the shuttle body the stud draws the conical head against the flange and draws the latter against the adjacent end of the shuttle.

With these and other objects in view which will appear as the description proceeds, the invention resides in the combination and arrangement of parts hereinafter described and set forth.

In the accompanying drawings, wherein two forms of the invention are shown,

Fig. 1 is a front elevation of a shuttle partly in cross section showing the preferred form of the invention applied thereto,

2

Fig. 2 is a plan view of the left end of the shuttle looking in the direction of arrow 2, Fig. 1, parts being broken away to show the stud, Fig. 3 is a vertical section on line 3—3 of Fig. 1, Fig. 4 is a plan view of the tip member, Fig. 5 is a transverse section on line 5—5, Fig. 4, Fig. 6 is a perspective view of the stud, Fig. 7 is a side elevation of the stud looking in the direction of arrow 7, Fig. 6, Fig. 8 is a transverse section on line 8—8, Fig. 6, Figs. 9 and 10 are diagrammatic views showing steps in the assembly of the tip and associated parts, and Fig. 11 is a view similar to a part of Fig. 1 but showing a modified form of the invention.

Referring particularly to Figs. 1 and 2, the shuttle S is provided with front and back walls 10 and 11, respectively, between which is located a compartment 12 to receive a supply of weft. One end of the shuttle may be provided with a thread delivery eye 13. The shuttle is picked back and forth across the loom by picking mechanism not shown which alternately engages the opposite ends of the shuttle. It is customary to provide each end of the shuttle with a shuttle tip member T having a conical metallic head designated herein at 15 for engagement with the loom picker. In the past difficulty has been experienced in holding these conical tip heads firmly in position in the shuttle.

The matter thus far described except as hereinafter noted may be of common construction, the body 16 of the shuttle being usually made of some non-metallic material, such as wood, while the tip head 15 is made of metal, such as steel. Since the tips are the same at each end of the shuttle only one of them will be described in detail.

In carrying the preferred form of the invention into effect the end of the shuttle body 16 is provided with a longitudinally extending preferably cylindrical bore 20 into which is fitted a shell or tubular member 21 the exterior surface of which 22 may be cylindrical to fit the bore 20. The tubular member 21 is provided with an internal bore 23 which tapers in a direction away from the adjacent end of the shuttle. The end of the tubular member adjacent to the tip head 15 may be provided with a flange 24 for engagement with the end wall 25 of the shuttle body. A transverse notch 26 is formed in the wall of the tubular member.

The tip head 15 is formed integral with a shank member 30 which is tapered in a direction away from the tip head and fits the bore 23. This shank is provided with a transverse notch 31 which registers with the notch 26.

Extending transversely of the body of the shuttle is a securing means or member, such as a stud or the like 35, one end of which is reduced and provided with screw threads 36. This stud has a wedging surface 37 so arranged as to give the stud a taper toward the screw threads 36. The end of the stud opposite to the screw threads may have a screw driver slot 38 formed thereon. A tightening means, such as a nut 40 on the screw threads 36, is provided to draw the stud transversely of the shuttle body 16 and the shank member. This nut fits into a hole or recess 41 in the shuttle body of larger diameter than the hole 42 through which the stud extends, thereby defining a shoulder 43 against which the nut exerts a force when drawing the thicker part of the stud through notches 26 and 31.

In assembling the shuttle tip the tubular member 21 will be driven into the bore 20 with its notch 26 facing in a given direction, such as upwardly, as indicated in Fig. 1. The shank 30 is then inserted into the tapered bore 23 with its notch 31 facing upwardly until the two notches register in some such position as shown in Fig. 9. The stud 35 is then inserted through the transverse bore 42 with the screw threads 36 moving toward recess 41 until its wedge surface 37 engages that side or surface 45 of the notch 31 which is adjacent to the small end of the tapered shank 30. The screw threaded end 36 will then extend into the recess or cavity 41 and the nut 40 will be fitted to it and tightened so as to draw the stud transversely of the shuttle body to the right as viewed in Fig. 3. This causes the wedging surface 37 to exert an inwardly directed force on the notch surface 45, thereby drawing the shank into the bore 23, see Fig. 9, and draws conical head 15 against flange 24. As the shank becomes firmly seated in bore 23 wedging surface 37 will engage an inclined surface 46 on the tubular member at the right side of notch 26, see Fig. 10, and further motion of the stud will move both the parts 21 and 30 into the shuttle body and draw flange 24 against the shuttle end wall 25. Rotation of the stud during tightening of the nut can be prevented by a screw driver fitted into slot 38.

In the modified form of the invention shown in Fig. 11 the parts used are essentially the same as those already described, but the metallic tubular member 21 is omitted. A shank 50, similar to shank 30, fits into a tapered bore 51 in the shuttle body 52 and the stud 53 is the same as stud 35. Shank 50 is provided with a notch 54 the side 55 of which adjacent to the small end of the tapered shank 50 engages a wedge surface 56 on the stud 53. Stud 53 is tapered as is stud 35. When drawn across the shank 50 transversely of the shuttle stud 53 draws the shank into the shuttle body.

From the foregoing it will be seen that the invention comprises simple means for holding a shuttle tip firmly in position on the shuttle. This means comprises two coacting tapered or wedge shaped members one formed as a shank for the shuttle tip member and the other formed as a stud which when drawn transversely of the shuttle body exerts a force on the shank tending to draw the latter into the shuttle body. In the preferred form of the invention the tubular member 21 and the shank are both prevented from rotating with respect to the shuttle by the stud 35, and are both drawn into the shuttle body by the stud to seat the head 15 against flange 24 and seat the latter against the shuttle body. It is not essential that the surface 46 be engaged by stud 35 in order to hold the tubular member in place. In the modified form of the invention the shuttle shank and stud may be essentially the same as that used in the preferred form of the invention.

Having thus described the invention it will be seen that changes and modifications of the foregoing specific disclosure may be made without departing from the spirit and scope of the invention.

What is claimed as new is:

1. In a loom shuttle having a body, a shuttle tip member having a head, and two coacting members holding the head in position on the shuttle body, one of said members being a shank on the head extending longitudinally into the shuttle body and having a transverse V-notch formed therein, and the other member extending transversely of the shank member and having a tapered part engaging the part of the shank member on the side of said V-notch adjacent to the end of said shank opposite to the head and effective when moved in the direction of the taper thereof transversely of the shank member along said side of the V-notch to draw the shank into the shuttle body.

2. In a loom shuttle having a body, a shuttle tip member having a head, and two coacting tapered members holding the head in position on the shuttle body, one of said members being a shank extending longitudinally into the shuttle body and integral with the tip head and having a transverse notch therein, and the other member extending transversely of the shank member and having a flat tapered surface engaging the side of the notch remote from the head and effective when moved in the direction of the taper thereof transversely of the shank member along said side of the notch to draw the shank into the shuttle body.

3. In a loom shuttle having a body, a shuttle tip member having a conical head and a shank extending away from the head into the shuttle body, a securing means in the shuttle body extending transversely of said shank and shuttle and having a screw thread at one end thereof and having a wedging surface thereon, said shank having a transverse notch therein with the side thereof adjacent to the end of the shank remote from the head engaging said wedging surface, and a nut on said screw thread engaging the shuttle body and effective when tightened on the screw thread to draw the wedging surface in a direction to cause the same to draw the shank into the shuttle body.

4. In a loom shuttle having a body, a shuttle tip member having a conical head and a shank extending into the body and tapering in a direction away from the head, a stud in the shuttle body extending transversely of said shank and shuttle and having a screw thread at one end thereof and having a part thereof tapering toward the screw thread, said shank having a transverse notch therein receiving the tapered part of said stud, and a nut on said screw thread engaging the shuttle body and effective when tightened on the screw thread to draw the stud transversely of the shuttle and cause said stud to exert a force on said shank tending to draw the latter into the shuttle body.

5. In a loom shuttle having a body, a tubular member extending longitudinally into the shuttle body at one end thereof and having a bore therein tapering in a direction away from said one end of the shuttle body, a shuttle tip member having a conical head projecting away from said tubular member and having a tapered shank member fitting said bore and formed with a notch extending transversely thereof, said tubular member having a notch therein registering with the notch in the shank member, and a securing means in the shuttle body extending transversely of the shuttle body and having a tapered part thereof located in said notches of the tubular and shank members, said securing means when moved transversely of the shuttle engaging said shank member and exerting forces on said tubular and shank members tending to draw the latter into the shuttle body.

6. In a loom shuttle having a body, a tubular member extending longitudinally into said body and having a flange thereon engaging the adjacent end of the shuttle body and having a bore therein tapered in a direction away from said flange, a shuttle tip member having a conical head engaging said flange and having a tapered shank member extending into and fitting said bore, said tubular and shank members having registering transverse notches therein, tapered securing means in the shuttle body extending transversely thereof and through said notches and engaging said shank member, and tightening means on said securing means engaging the shuttle body effective to move the securing means transversely of the tubular and shank members to draw the latter into the shuttle body and draw said conical head against said flange.

7. In a loom shuttle having a body, a tubular member extending longitudinally into said body and having a flange thereon engaging the adjacent end of the shuttle body and having a bore therein tapered in a direction away from said flange, a shuttle tip member having a conical head engaging said flange and having a tapered shank member extending into and fitting said bore, said tubular and shank members having registering transverse notches therein, a stud extending transversely of the shuttle body and having a screw thread on one end thereof and having part thereof tapered toward said screw thread and located in said notches and engaging said tubular and shank members, and a nut on said screw threads engaging the shuttle body and effective when tightened on said screw threads to draw the stud transversely of the shuttle body to draw said tubular and shank members into said shuttle body and draw said flange against said end of the shuttle body and draw said head against said flange.

ALEXANDER C. KRUKONIS.

REFERENCES CITED

The following references are of record in the file of this patent:

UNITED STATES PATENTS

| Number | Name | Date |
|---|---|---|
| 1,292,886 | Rolston | Jan. 28, 1919 |
| 2,409,003 | Turner | Oct. 8, 1946 |

FOREIGN PATENTS

| Number | Country | Date |
|---|---|---|
| 1,880 | Great Britain | of 1880 |
| 173,691 | Switzerland | Mar. 16, 1935 |
| 357,711 | France | Nov. 21, 1905 |
| 475,646 | Germany | Apr. 27, 1929 |